United States Patent
Jaaskelainen et al.

(10) Patent No.: US 10,260,328 B2
(45) Date of Patent: Apr. 16, 2019

(54) FRACTURE GROWTH MONITORING USING EM SENSING

(71) Applicant: Halliburton Energy Services, Inc., Houston, TX (US)

(72) Inventors: Mikko Jaaskelainen, Katy, TX (US); Ken Smith, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 15/306,464

(22) PCT Filed: Apr. 24, 2014

(86) PCT No.: PCT/US2014/035368
§ 371 (c)(1),
(2) Date: Oct. 24, 2016

(87) PCT Pub. No.: WO2015/163899
PCT Pub. Date: Oct. 29, 2015

(65) Prior Publication Data
US 2017/0044886 A1    Feb. 16, 2017

(51) Int. Cl.
*E21B 43/26*    (2006.01)
*E21B 47/135*    (2012.01)
*G01V 3/30*    (2006.01)
*G01V 8/02*    (2006.01)
*G01V 3/26*    (2006.01)
*E21B 47/09*    (2012.01)
*E21B 47/12*    (2012.01)

(52) U.S. Cl.
CPC .......... *E21B 43/26* (2013.01); *E21B 47/0905* (2013.01); *E21B 47/123* (2013.01); *G01V 3/26* (2013.01)

(58) Field of Classification Search
CPC .... E21B 49/006; E21B 49/008; E21B 47/123; E21B 43/26; G01V 3/26; G01V 3/30; G01V 8/02
USPC .......... 166/50, 250.1, 308.1, 272.7; 385/107, 385/123
See application file for complete search history.

(56) References Cited

U.S. PATENT DOCUMENTS

| | | | | |
|---|---|---|---|---|
| 6,928,202 B2* | 8/2005 | Pickrell | ............. | G02B 6/02209 385/107 |
| 8,863,833 B2* | 10/2014 | Mescall | ................ | E21B 34/063 166/222 |
| 9,261,620 B2* | 2/2016 | Mangione | ................ | G01V 3/12 |
| 9,575,209 B2* | 2/2017 | Samson | ................ | E21B 47/123 |
| 2002/0027004 A1* | 3/2002 | Bussear | ................. | E21B 37/06 166/250.15 |

(Continued)

FOREIGN PATENT DOCUMENTS

GB    20130015987    9/2013

OTHER PUBLICATIONS

AU Patent Examination Report, dated Feb. 21, 2017, Appl No. 2014391630, "Fracture Growth Monitoring Using EM Sensing," Filed Apr. 24, 2014, 3 pgs.

(Continued)

*Primary Examiner* — Kenneth L Thompson
(74) *Attorney, Agent, or Firm* — Gilliam IP PLLC

(57) ABSTRACT

A method and system for using a distributed electromagnetic sensing system in horizontal hydraulic fracturing wells to monitor fracture growth in real time.

14 Claims, 7 Drawing Sheets

(56) References Cited

U.S. PATENT DOCUMENTS

| | | | |
|---|---|---|---|
| 2003/0205376 A1* | 11/2003 | Ayoub | E21B 43/26 |
| | | | 166/254.2 |
| 2005/0183858 A1 | 8/2005 | Ayoub et al. | |
| 2007/0256830 A1 | 11/2007 | Entov et al. | |
| 2011/0272147 A1 | 11/2011 | Beasley et al. | |
| 2012/0014211 A1* | 1/2012 | Maida, Jr. | E21B 47/09 |
| | | | 367/13 |
| 2012/0111560 A1* | 5/2012 | Hill | E21B 43/11857 |
| | | | 166/250.1 |
| 2013/0154846 A1 | 6/2013 | Mangione et al. | |
| 2013/0279841 A1* | 10/2013 | Joinson | E21B 47/0905 |
| | | | 385/12 |
| 2014/0097848 A1 | 4/2014 | Leblanc et al. | |
| 2015/0083405 A1* | 3/2015 | Dobroskok | E21B 47/0002 |
| | | | 166/250.1 |

OTHER PUBLICATIONS

PCT International Search Report and Written Opinion, dated Jan. 12, 2015, Appl No. PCT/US2014/035368, "Fracture Growth Monitoring Using EM Sensing", filed Jan. 12, 2015, 14 pgs.

PCT International Preliminary Report on Patentability, dated Nov. 3, 2016, Appl No. PCT/US2014/035368, "Fracture Growth Monitoring Using EM Sensing," Filed Apr. 24, 2014, 11 pgs.

CA Application Serial No. 2,945,000, First Office Action, dated Nov. 7, 2017, 3pgs.

\* cited by examiner

FRACTURE GROWTH MONITORING USING EM SENSING

BACKGROUND

Hydraulic fracturing is a technology that has evolved into a mature, complex level The use of hydraulic fracturing is critical to the economical production of hydrocarbons; and is a significant portion of the well-development cost. Despite the progress, it is still not fully understood, and can be interpreted poorly. Although the physical laws governing fracturing are known, the constant emergence of new mechanisms indicates that the basic physics incorporated into models has not been sufficient to model a fracture fully.

The reasons for the uncertainty surrounding the fracturing process are clear. The Earth is a complex, discontinuous medium, and historically there has been limited technology for observing or inferring fracturing results. Nothing can be done about the complexity of typical reservoirs in the Earth, and one can expect that difficulties with complexity will increase as more marginal reservoirs are exploited. On the other hand, diagnostic capabilities continue to improve and technology is reaching the point where fracture diagnostics can be applied by the average producer in problem situations, in new fields, or for validation of new fracturing techniques.

Furthermore, as operators continue to work in difficult, complex lithologies, it becomes clear that stimulation problems cannot be solved without some diagnostic data from which judicious decisions can be made. Diagnostics cost money, but trial-and-error approaches often cost more money and can result in lost wells. Decisions on well spacing, field layout, sand concentrations and volumes, number of zones that can be stimulated in one treatment, optimum perforation schedule, and many other operational parameters can be made correctly if the proper diagnostic information is available in a timely manner.

Recent developments in the use of electromagnetic sensing to monitor wafer fronts during water injection of conventional oil formations offer the possibility of applying electromagnetic sensing to monitor fracture growth during hydraulic fracturing operations. The concept would be to deploy a distributed or multi-point electromagnetic sensing system into a hydraulic fracturing wellbore before hydraulic fracturing begins. And then to possibly use fracturing fluids with different resistivity properties as well as the use of particles that have desirable properties (e.g. coated electromagnetic particles). The change in electromagnetic field and/or reservoir properties could then potentially be used to monitor fracturing operations in real time to maximize reservoir production performance.

There is a need then to develop these new capabilities for monitoring of the progress of hydraulic fracturing operations.

DETAILED DESCRIPTION

This need for new monitoring capabilities is addressed in the following approach.

Figure 1:
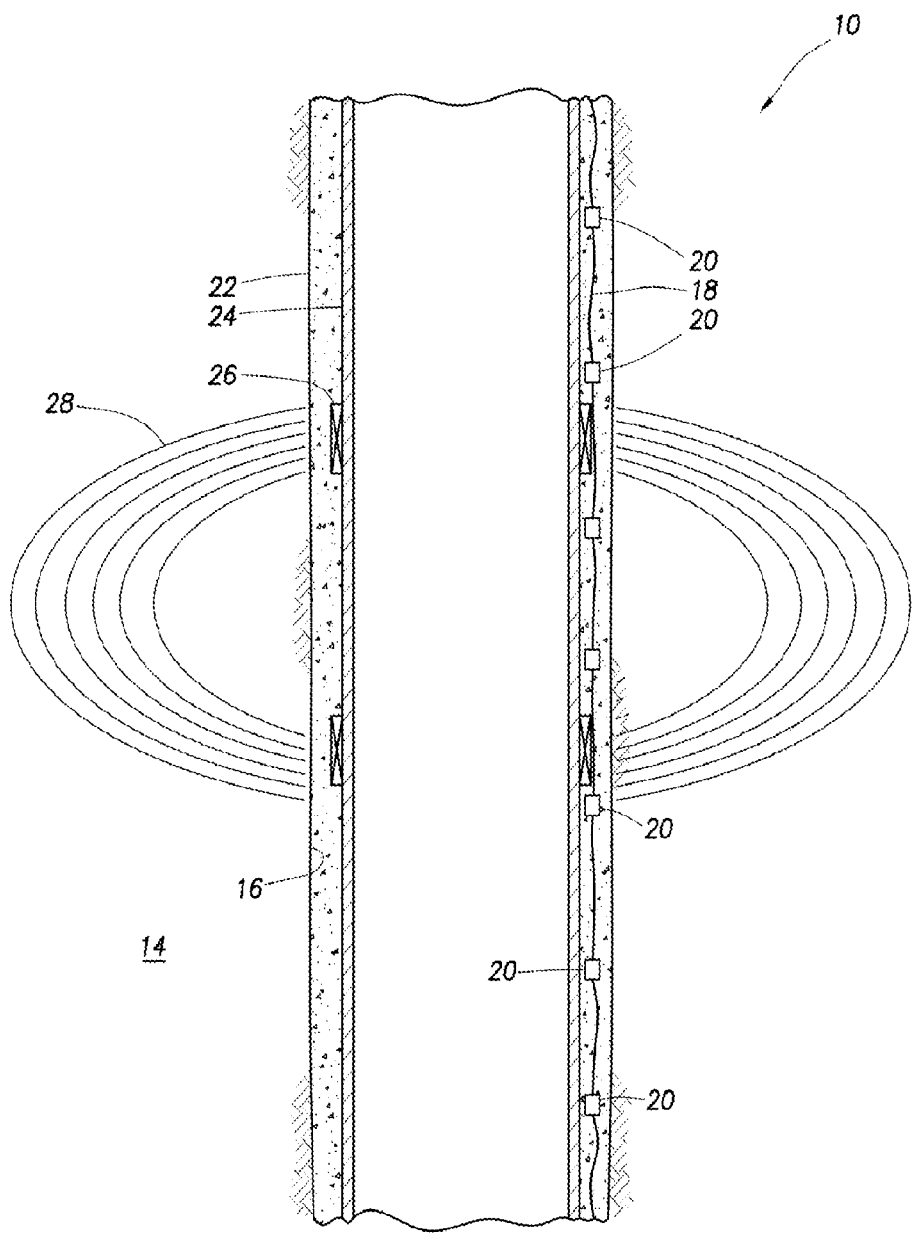
FIG. 1 illustrates a representative cross-section of a horizontal wellbore showing one possible technique for deploying a distributed electromagnetic sensing system.

Representatively illustrated in FIG. 1 is a system 10 for use with a subterranean well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1, system 10 is illustrating a downward look at a horizontal wellbore deployed within a shale formation 14. Illustrated are a series of optical electromagnetic sensors 20 installed in the wellbore 16 along an optical cable 18. The cable 18 and sensors 20 illustrated in this example are positioned in cement 22 surrounding casing 24.

In the FIG. 1 system 10, monitoring is accomplished by detecting changes in resistivity in the formation 14 over time. This is preferably accomplished by measuring resistivity contrasts. The resistivity of the formation 14 is obtained through the measurement of electromagnetic fields in the formation using the optical or electrical electromagnetic sensors 20, which are preferably permanently installed in the wellbore 16, so that continuous monitoring overtime is available.

In this example shown transmitters 26 permanently installed in the wellbore can be used to generate electromagnetic energy consisting of electric and magnetic field components. Thus, electromagnetic fields 28 (e.g., primary, secondary, etc., fields) are induced in the formation 14. However, it should be clearly understood that the scope of this disclosure is not limited at all to any particular way of inducing electromagnetic fields in a formation, or to any particular type of electromagnetic fields induced in a formation.

The transmitter 26 could comprise coils external to the casing 24. In other examples, the casing 24 itself could be used to generate the electromagnetic fields 28, such as, by using the casing as a conductor.

In further examples, the transmitter 26 could be positioned in another wellbore, at the earth's surface, or in another location. The scope of this disclosure is not limited to any particular position of a transmitter, to any particular type of transmitter, or to any particular technique for generating an electromagnetic field in the formation 14.

The sensors 20 detect the electromagnetic field 28. Measurements of the electromagnetic field 28 are then inverted to obtain the resistivity of the formation 14 in the vicinity of each sensor.

In some examples, a time-lapse measurement may be performed, in which electric or magnetic fields at each sensor 20 location are measured as a function of time. In a time-lapse measurement system, first a sensor signal is recorded at a time before hydraulic fracturing has begun. Then, as hydraulic fracturing advances a differential signal (between the no fracturing case and with the fracturing case)

at each sensor is recorded. As fracturing proceeds and approaches closer to a particular sensor 20, the differential signal gets larger. The intensity of the signal can indicate the progress of the fracture front.

The final output of the system could either be resistivity or direct electromagnetic field, depending on a post-processing algorithm used. Direct field measurement is comparatively straightforward, while converting the direct measurement to resistivity makes the post-processing more complicated.

Basically, in the sensors 20, a physical perturbation interacts with an optical waveguide to directly modulate light traveling through the waveguide. This modulated signal travels back along the same or another waveguide to a signal interrogation system, where the signal is demodulated, and the corresponding perturbation is determined.

Preferably, an optical fiber (or another optical waveguide, such as an optical ribbon, etc.) is bonded to or Jacketed or coated by a ferromagnetic material which is a magnetostrictive material used as a magnetic field receiver. Such materials undergo a change in shape or dimension (e.g., elongation or contraction) in the presence of a magnetic field.

This property is known as magnetostriction. Some widely used magnetostrictive materials are Co, Fe, Ni, and iron-based alloys METGLAS™ and TERFENOL-D™.

The sensors 20 can be used to measure electric fields when the optical waveguide is bonded to or jacketed or coated by a ferroelectric material which is an electrostrictive material. Ferroelectric materials undergo a change in shape or dimension in the presence of an electric field. This property is known as electrostriction. Some examples of electrostrictive ceramics are lead magnesium niobate (PMN), lead magnesium niobate-lead titanate (PMN-PT) and lead lanthanum zirconate titanate (PLZT).

However, it should be clearly understood that the scope of this disclosure is not limited to use of any particular magnetostrictive or electrostrictive material. Any suitable material which changes shape in response to exposure to a magnetic and/or electric field may be used.

The use of such a distributed electromagnetic monitoring system in a hydraulic fracturing operation can be illustrated progressively in the following series of FIGS. 2-7. Fracturing fluids can be made with different resistivity, and can also be mixed with particles that have desirable properties like e.g. coated electro-magnetic particles. The change in EM field and/or reservoir properties can then be used to model fracture growth, size and shape. This information can be used to enhance models and fracture treatments in real-time to maximize reservoir contact.

By having multiple sources and receivers, conclusions can be drawn by looking at deviations from base-line, and/or by measuring resistivity before, during and after a fracture. Different fluid path changes and the area that is covered will give different measurement signals between various sensors. The resistive path from Source 1 (S1) to Receiver 2 (R2) changes as fracture fluid enters the reservoir and fractures the rock in the path from S1 to R2. Additional change occurs as the fracturing progresses.

Figure 2:
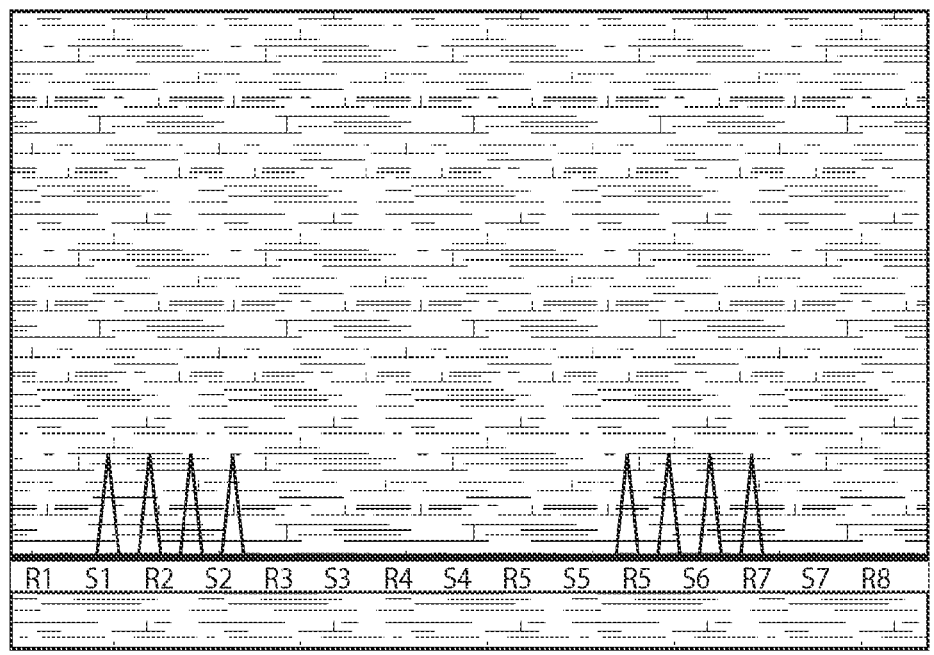
FIG. 2 illustrates a hydraulic fracturing wellbore in the early stages of perforation.
Figure 3:
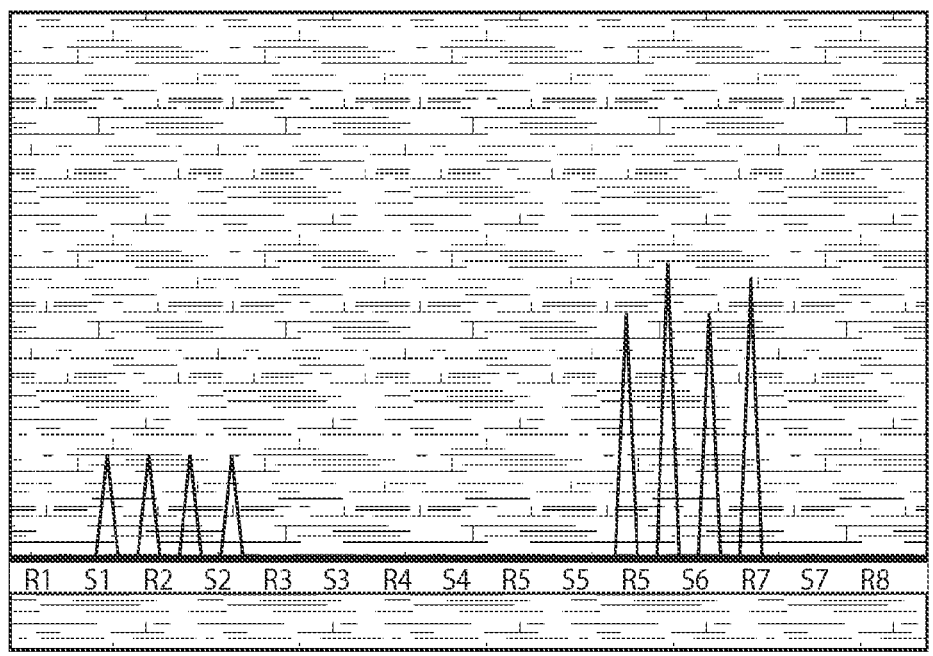
FIG. 3 illustrates a hydraulic fracturing wellbore with more extensive perforations in one region.

Consider FIG. 2. FIG. 2 illustrates a hydraulic fracturing wellbore that has been perforated in 2 different locations with 4 perforations each. FIG. 2 and the remaining figures are a downward look into a formation in which a horizontal wellbore with a series of sources (S1, S2, S3, etc) and receivers (R1, R2, R3, etc.) are shown deployed along the wellbore. The Sources may be envisioned as the perforations in the well bore through which hydraulic fluids may flow and the Receivers may be thought of as locations where electromagnetic sensors lie. In this idealized case there are exactly alternating Sources and Receivers, but the concept is not limited to the idealized case. The eight "spikes" shown are initial fractures early in the process from the initial perforations. FIG. 3 then might represent a later period in which the fracturing process has started and the perforations grow as the pressure increases, fluid enters and expands the perforations on the right hand region along the wellbore.

Figure 4:
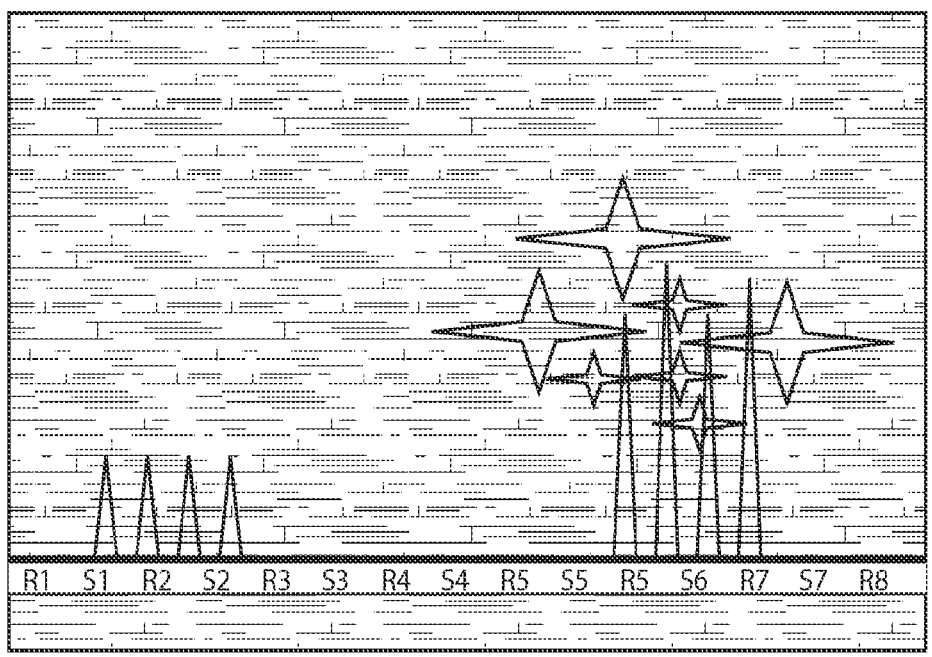
FIG. 4 illustrates a hydraulic fracturing wellbore with fracturing in one region.

FIG. 4 now illustrates that the region around S6 has now undergone the first hydraulic fracturing, represented by the spreading fracture cracks. The zone around S1/S2 is still only perforated.

Figure 5:
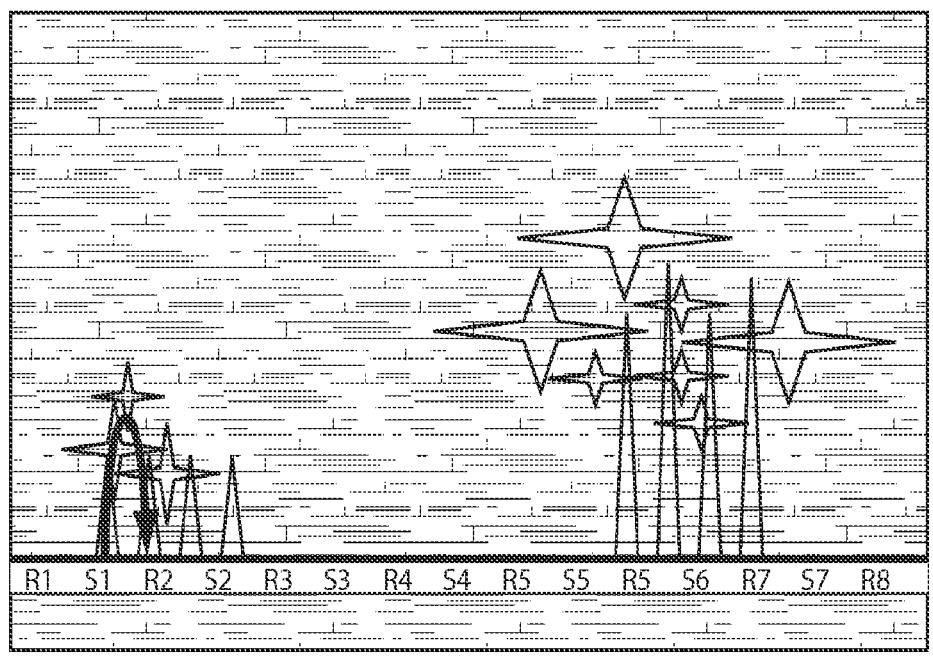
FIG. 5 illustrates a hydraulic fracturing wellbore with fracturing beginning in a new region.

FIG. 5 now illustrates the beginning of hydraulic fracturing around the region of S1/S2. It is envisioned that this can be done in an experimental fashion by, for example, placing a packer (not shown) in the region between S3 and S5 so that hydraulic fracturing could be done preferentially in the S1-S3 region.

By having multiple sources and receivers, conclusions can be drawn by looking at deviations from base-line, and/or by measuring resistivity before, during and after a fracture. Different fluid path changes and the area that is covered will give different measurement signals between various sensors. The resistive path from Source 1 (S1) to Receiver 2 (R2) changes as fracturing fluids enters the reservoir and fractures the rock in the path from S1 to R2. Additional change occurs as the fracturing progresses.

Figure 6:
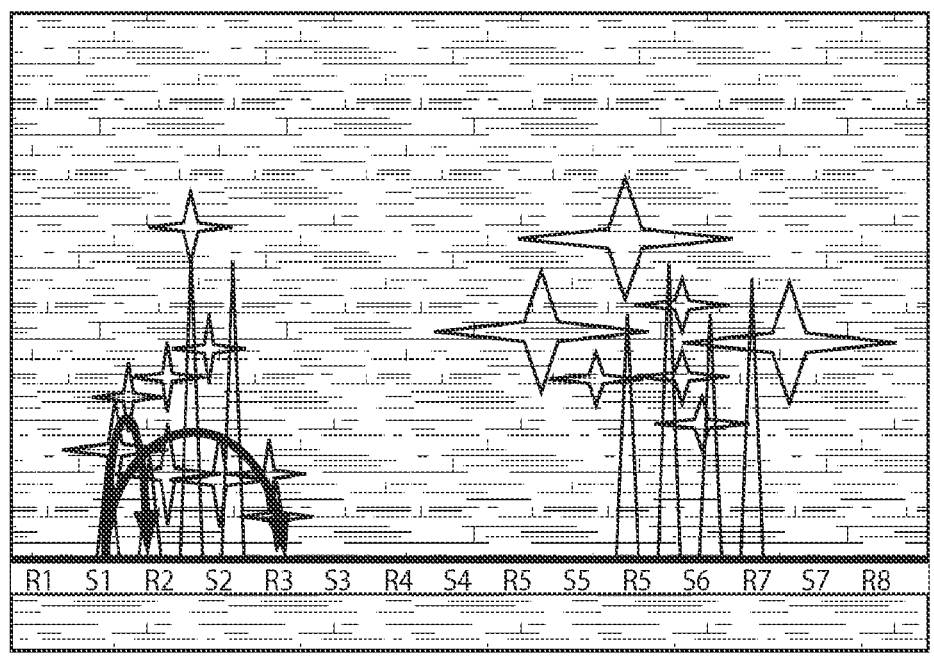
FIG. 6 illustrates a hydraulic fracturing wellbore more extensive fracturing in the new region.
Figure 7:
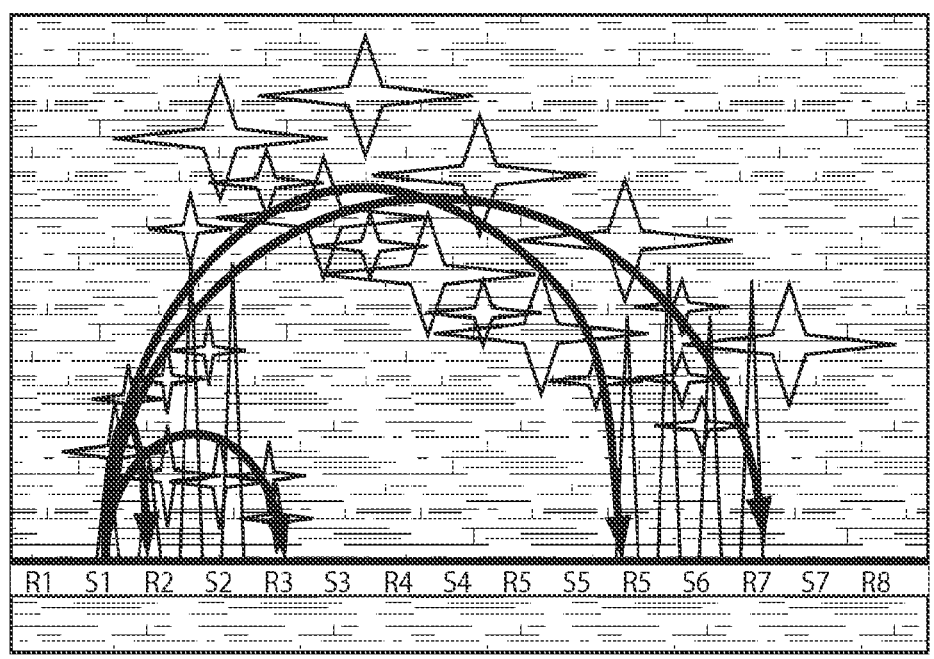
FIG. 7 illustrates a hydraulic fracturing wellbore much more extensive fracturing in both regions.

As the fracturing proceeds with source 1 active in FIG. 6 the signal reaches receiver 2 and Receiver 3 during the fracturing. Progressively Receiver R2 and then R3 will experience a changing resistivity.

Finally in advanced stages (see FIG. 7) of the hydraulic fracturing with the source 1 active signals eventually reach R2, R3 R6, and R7.

The information gathered during this controlled operation can be combined with Distributed Acoustic Sensing (DAS), Distributed Temperature Sensing (DTS) and pressure measurements to provide near well bore measurements in addition to micro-seismic and tilt measurements used for reservoir diagnostics.

The combinations of all of this information will enhance the ability to predict and optimize reservoir contact and provide significant advantages in well completion.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

What is claimed is:

1. A method for monitoring the progress of a hydraulic fracturing operation in a subterranean earth formation, the method comprising:

installing a distributed series of electromagnetic sensors along a wellbore before hydraulic fracturing, each sensor comprising an optical waveguide and a material, wherein the material in each sensor changes shape in response to exposure to an electromagnetic field induced in the formation and strain is induced in the optical waveguide in response to the material changing shape;

installing an electromagnetic field generating system for generating an electromagnetic field in the region of a horizontal wellbore;

using the electromagnetic field generating system to generate an electromagnetic field in the region of the horizontal wellbore;

creating perforations along the wellbore spaced apart from the distributed series of electromagnetic sensors;

selectively applying hydraulic fracturing fluid through chosen perforations; and measuring changes in the electromagnetic field of the formation from nearby electromagnetic sensors to monitor the progress of the hydraulic fracturing.

2. The method of claim 1 wherein the material comprises a magnetorestrictive material.

3. The method of claim 1 wherein the material comprises an electrorestrictive material.

4. The method of claim 1 wherein the material is bonded directly to or coated on the optical waveguide.

5. The method of claim 1 further comprising installing the distributed series of electromagnetic sensors within a wellbore.

6. The method of claim 1 further comprising installing the distributed series of electromagnetic sensors in cement between a casing and a wellbore.

7. The method of claim 1 wherein the hydraulic fracturing fluids used comprise coated electromagnetic particles.

8. A hydraulic fracturing well monitoring system comprising:

a horizontal wellbore with a series of perforations along the length of the wellbore;

an electromagnetic field generating system for generating an electromagnetic field in the region of the horizontal wellbore; and a distributed series of electromagnetic sensors installed along the wellbore before hydraulic fracturing to measure changes in the electromagnetic field of the formation from nearby electromagnetic sensors to monitor the progress of the hydraulic fracturing, each sensor comprising an optical waveguide and a material that changes shape in response to exposure to an electromagnetic field and strain is induced in the optical waveguide in response to the material changing shape.

9. The hydraulic fracturing well monitoring system of claim 8 wherein the electromagnetic field generating system comprises one or more electromagnetic generators installed in the wellbore.

10. The hydraulic fracturing well monitoring system of claim 8 wherein the electromagnetic field generating system comprises coils external to the casing of the wellbore.

11. The hydraulic fracturing well monitoring system of claim 8 wherein the electromagnetic field generating system is positioned in a nearby wellbore.

12. The hydraulic fracturing well monitoring system of claim 8 wherein the electromagnetic field generating system is positioned at the earth's surface.

13. The hydraulic fracturing well monitoring system of claim 8 wherein the material is bonded directly to or coated on the optical waveguide.

14. The hydraulic fracturing well monitoring system of claim 8 wherein the distributed series of electromagnetic sensors is permanently installed in a wellbore.

* * * * *